United States Patent
Kamijima

(10) Patent No.: US 6,497,825 B1
(45) Date of Patent: Dec. 24, 2002

(54) MANUFACTURING METHOD OF THIN-FILM MAGNETIC HEAD

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 123 days.

(21) Appl. No.: 09/637,210

(22) Filed: Aug. 14, 2000

(30) Foreign Application Priority Data

Sep. 8, 1999 (JP) ............................................. 11-254027

(51) Int. Cl.[7] ............................................... G11B 5/127
(52) U.S. Cl. .............................. 216/22; 216/2; 216/11; 216/52; 216/53; 430/320; 430/316; 29/603.14; 29/603.16; 29/603.12; 29/603.01; 204/192.32; 204/192.35
(58) Field of Search ................................. 216/2, 11, 22, 216/52, 53; 29/603.14, 603.15; 204/193.32; 360/126, 317

(56) References Cited

U.S. PATENT DOCUMENTS

| | | | | |
|---|---|---|---|---|
| 5,600,519 A | * | 2/1997 | Heim et al. ................. 360/126 |
| 5,916,423 A | * | 6/1999 | Westwood ............. 204/193.32 |
| 5,938,941 A | * | 8/1999 | Ishiwata et al. ............... 216/22 |
| 5,996,213 A | * | 12/1999 | Shen et al. ............... 29/603.15 |
| 6,103,073 A | * | 8/2000 | Thayamballi ............ 204/192.2 |
| 6,119,331 A | * | 9/2000 | Chang et al. ............ 29/603.14 |
| 6,130,809 A | * | 10/2000 | Santini ........................ 360/317 |
| 6,255,040 B1 | * | 7/2001 | Sasaki ..................... 29/603.07 |
| 6,330,127 B1 | * | 12/2001 | Sasaki ........................ 360/126 |

* cited by examiner

Primary Examiner—Randy Gulakowski
Assistant Examiner—Gentle Winter
(74) Attorney, Agent, or Firm—Armstrong, Westerman & Hattori, LLP

(57) ABSTRACT

A method of manufacturing a thin-film magnetic head, includes a first step of forming a second magnetic pole layer (an upper magnetic pole layer) on a magnetic gap layer formed on a first magnetic pole layer (a lower magnetic pole layer) so that the second magnetic pole layer opposes to the first magnetic pole layer via the magnetic gap layer, and a second step of dry etching a part of an upper surface of the first magnetic pole layer surrounding the second magnetic pole layer used as an etching mask to make a width of the dry-etched part of the first magnetic pole layer equal to a width of the second magnetic pole layer. The first step includes shaping at least part of the second magnetic pole layer so that the width of the second magnetic pole layer increases as a throat height becomes large.

16 Claims, 6 Drawing Sheets

*Fig. 7a*  *Fig. 7b*  *Fig. 7c*
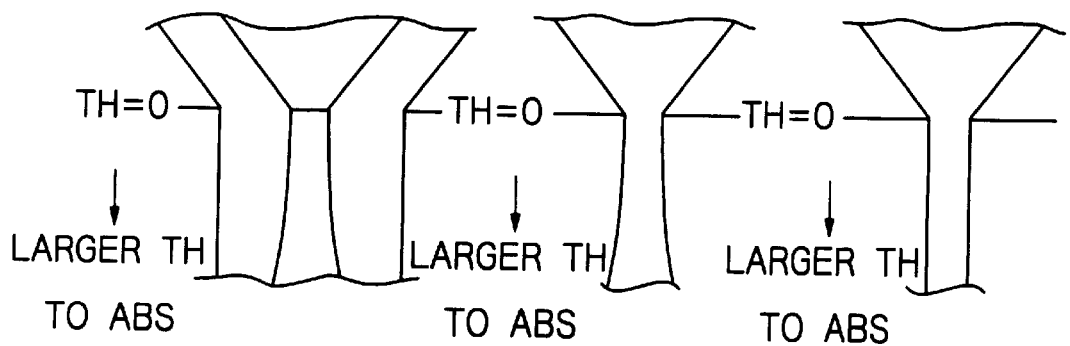
*Fig. 8a*  *Fig. 8b*  *Fig. 8c*
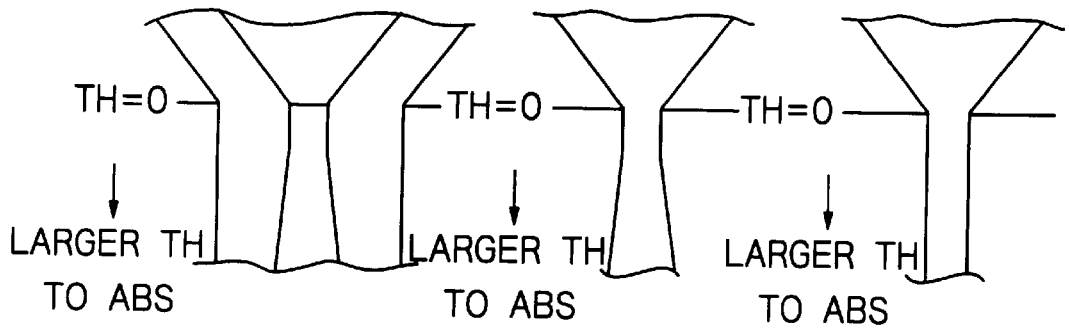
*Fig. 9a*  *Fig. 9b*  *Fig. 9c*
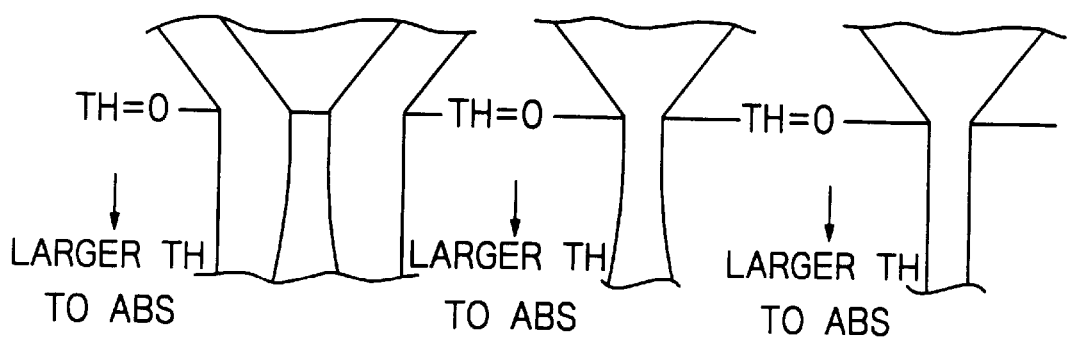

MANUFACTURING METHOD OF THIN-FILM MAGNETIC HEAD

FIELD OF THE INVENTION

The present invention relates to a method for manufacturing a thin-film magnetic head with at least an inductive writing head element.

DESCRIPTION OF THE RELATED ART

A method for manufacturing a thin-film magnetic head with only an inductive writing head element, or a composite type thin-film magnetic head with both an inductive writing head element and a magnetoresistive effect (MR), giant magnetoresistive effect (GMR) or tunneling magnetoresistive effect (TMR) reading head element may include a process of forming a magnetic gap layer on a lower magnetic pole (or an upper shield layer when it is the composite type thin-film magnetic head), a process of forming an upper magnetic pole layer on the magnetic gap layer by frame plating, and a trimming process performed thereafter. In the trimming process, a part of the upper surface of the lower pole layer surrounding the upper pole layer used as an etching mask is dry-etched to make a protruded portion or a pedestal of the lower pole layer. This trimming process aims to make a width $PW_L$ of the protruded portion of the lower pole layer (hereinafter also called as a pole width), which opposes the upper pole layer via the gap layer, equal to a width $PW_U$ of the upper pole layer (hereinafter also called as a pole width) by dry etching.

The term of "dry etching" executed in this trimming process has broad meaning including ion milling, reactive ion etching (RIE) and other etching. However, in the following description, examples using the ion milling will be explained.

In the conventional fabricating process using such a trimming process, the width $PW_U$ of the upper pole layer after the trimming process will not have a constant value along a throat-height (TH) direction. The more the throat height TH increases, the narrower the width $PW_U$ becomes.

FIGS. 1a to 1c are plane views schematically illustrating a plane shape of a resist frame and an upper magnetic pole layer seen from the direction of multi-layering when fabricated by the conventional method.

More detail, FIG. 1a represents a plane shape of a resist frame when the upper pole layer is fabricated by using a frame plating method, FIG. 1b represents a plane shape of the upper pole layer formed by the plating, and FIG. 1c represents a plane shape of the upper pole layer after the trimming. It should be noted that these figures indicate the plane shapes around a region where the throat height TH is zero.

In general, a photo-mask used for making a resist frame has the same shape as the resist frame.

As will be noted from the figures, according to the conventional method, the upper pole layer is frame-plated so that its width $PW_U$ is kept constant along the throat-height direction. If ion milling is executed using such an upper pole layer as a milling mask, since the upper pole layer itself will be removed not only in its depth direction but also in its width direction and an etching rate will increase as the throat height TH becomes large, the width PW of the upper and lower pole layers becomes gradually small depending upon the change of the etching rate. Since an incoming angle of the ion beam is slanting to the upper pole layer, this ion beam will be shadowed by the level difference of an insulation layer or a yoke located behind the upper pole layer arises. For this reason, the change of the etching rate will occur. The amount of this change of the pole width PW in the throat-height direction depends upon the three-dimensional shape of elements near the zero throat-height position (TH=0), such as the insulation layer and the yoke, or on the conditions of the ion milling.

If the pole width PW varies along with the throat-height direction, in the polishing process for adjusting the throat height (throat-height adjustment process) performed thereafter, a pole end edge width will vary according to the polished amount, and the yield of magnetic head manufacturing will get worse.

SUMMARY OF THE INVENTION

It is therefore an object of the present invention to provide a method of manufacturing a thin-film magnetic head, whereby throat-height dependability of a pole width can be eliminated, and thus a pole end edge width can be prevented from varying.

According to the present invention, a method of manufacturing a thin-film magnetic head, includes a first step of forming a second magnetic pole layer (an upper magnetic pole layer) on a magnetic gap layer formed on a first magnetic pole layer (a lower magnetic pole layer) so that the second magnetic pole layer opposes to the first magnetic pole layer via the magnetic gap layer, and a second step of dry etching a part of an upper surface of the first magnetic pole layer surrounding the second magnetic pole layer used as an etching mask to make a width of the dry-etched part of the first magnetic pole layer equal to a width of the second magnetic pole layer. Particularly, according to the present invention, the first step includes shaping at least part of the second magnetic pole layer so that the width of the second magnetic pole layer increases as a throat height becomes large.

At least part of the upper pole layer is formed in a shape that the width of the upper pole layer increases as a throat height becomes large. Thus, even if the upper pole layer itself is partly removed in its width direction to decrease its width, this decrease in the pole width is compensated so that the width of the upper and lower pole layers after the dry etching is kept constant along the throat-height direction. Therefore, in the polishing process for adjusting the throat height performed thereafter, a pole end edge width will not vary according to the machined or polished amount, and thus the yield of magnetic head manufacturing can be prevented from getting worse.

It is preferred that the first step includes shaping the second magnetic pole layer so that the width of the second magnetic pole layer increases from a position of a zero throat-height as the throat height becomes large.

In this case, it is preferred that the width of the second magnetic pole layer continuously, namely linearly or in curve, increases as the throat height becomes large.

In this case, it is also preferred that the width of the second magnetic pole layer discontinuously increases as the throat height becomes large.

It is preferred that the first step includes shaping the second magnetic pole layer so that the width of the second magnetic pole layer increases within a region of the throat height TH=0 to +3 μm as the throat height becomes large.

It is also preferred that the first step includes shaping the second magnetic pole layer so that the width of the second magnetic pole layer is kept constant from a position of a zero throat-height to a predetermined position of a larger throat-height and increases from the predetermined position as the throat height becomes large.

In this case, it is preferred that the width of the second magnetic pole layer continuously, namely linearly or in curve, increases from the predetermined position as the throat height becomes large.

In this case, it is also preferred that the width of the second magnetic pole layer discontinuously increases from the predetermined position as the throat height becomes large.

It is also preferred that the first step includes shaping the second magnetic pole layer so that the width of the second magnetic pole layer increases depending upon a change in etching rate of the dry etching.

It is further preferred that the first step includes shaping the second magnetic pole layer so that the width of the second magnetic pole layer increases depending upon an etching rate near a position of a zero throat-height during the dry etching and upon etching rates at predetermined positions with larger throat heights during the dry etching.

It is preferred that the first step includes shaping the second magnetic pole layer so that the width of the second magnetic pole layer increases depending upon etching rates determined by measuring, after the dry etching, widths of a sample that has a constant width along the throat-height direction before the dry etching.

It is also preferred that the first step includes patterning the second magnetic pole layer by a plating process.

Further objects and advantages of the present invention will be apparent from the following description of the preferred embodiments of the invention as illustrated in the accompanying drawings.

BRIEF DESCRIPTION OF THE DRAWINGS

FIGS. 7a to 7c are plane views schematically illustrating a plane shape of a resist frame and an upper magnetic pole layer seen from the direction of multi-layering in a second embodiment according to the present invention;

FIGS. 8a to 8c are plane views schematically illustrating a plane shape of a resist frame and an upper magnetic pole layer seen from the direction of multi-layering in a third embodiment according to the present invention; and FIGS. 9a to 9c are plane views schematically illustrating a plane shape of a resist frame and an upper magnetic pole layer seen from the direction of multi-layering in a fourth embodiment according to the present invention.

DESCRIPTION OF THE PREFERRED EMBODIMENTS

Figure 2:
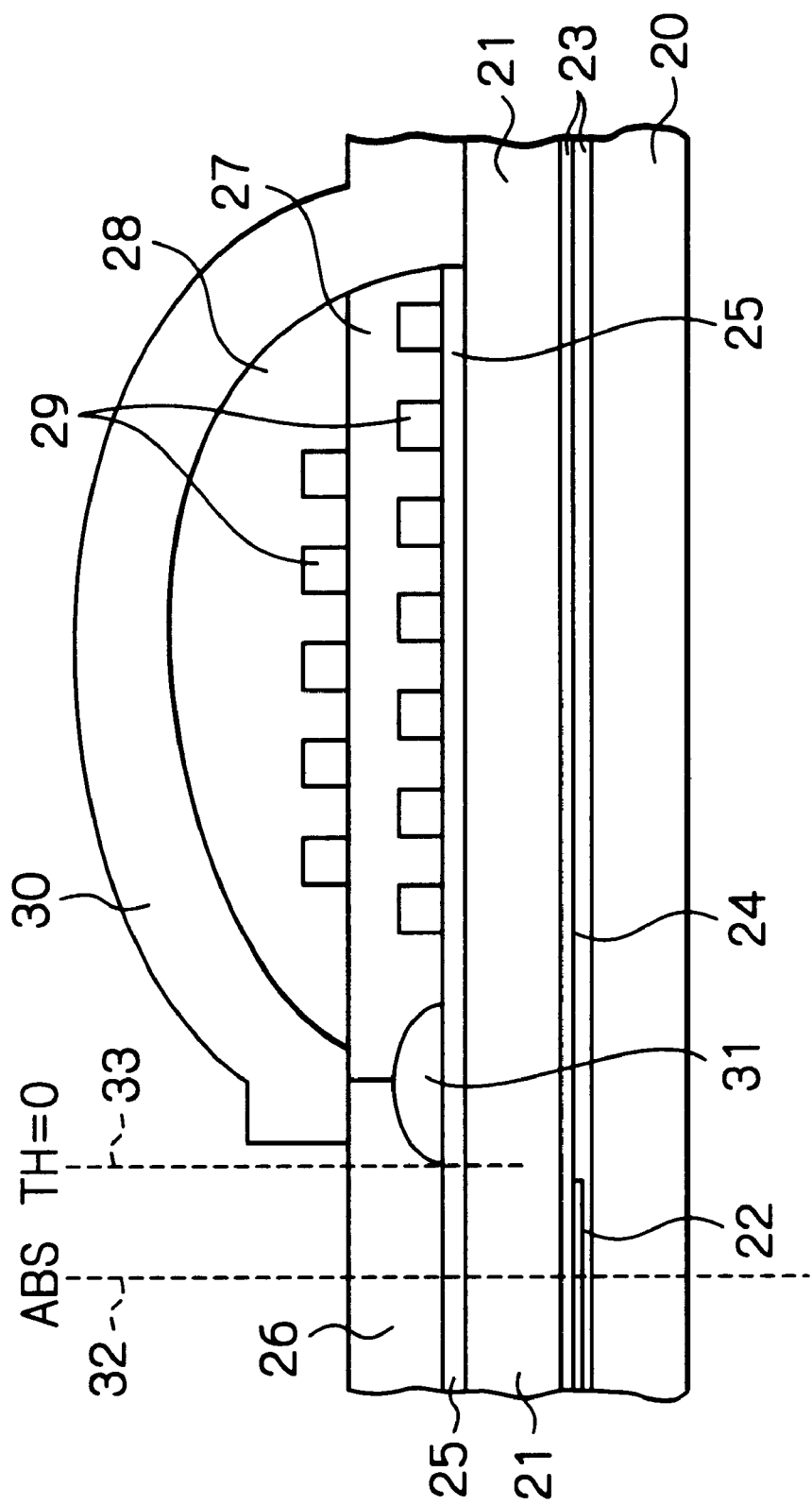
FIG. 2 is a sectional view schematically illustrating an essential part of a thin-film magnetic during a wafer process as a first embodiment according to the present invention.
Figure 3A:
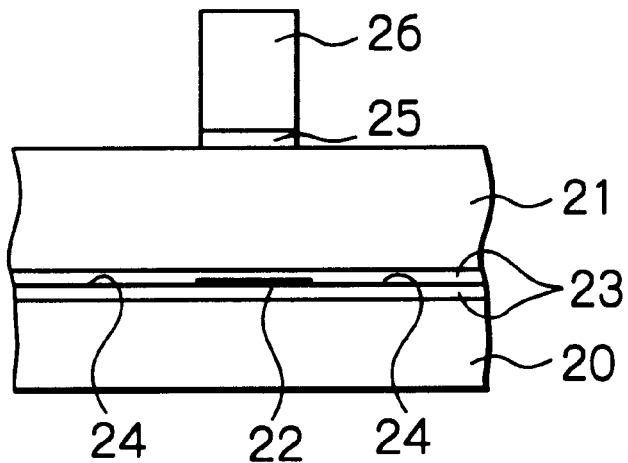
FIGS. 3a and 3b are sectional views of the thin-film magnetic head of the first embodiment shown in FIG. 2, seen from a plane parallel to an air bearing surface (ABS), in which FIG. 3a indicates the state after a plating process of the upper pole layer but before a trimming process and FIG. 3b indicates the state after the trimming process.
Figure 3B:
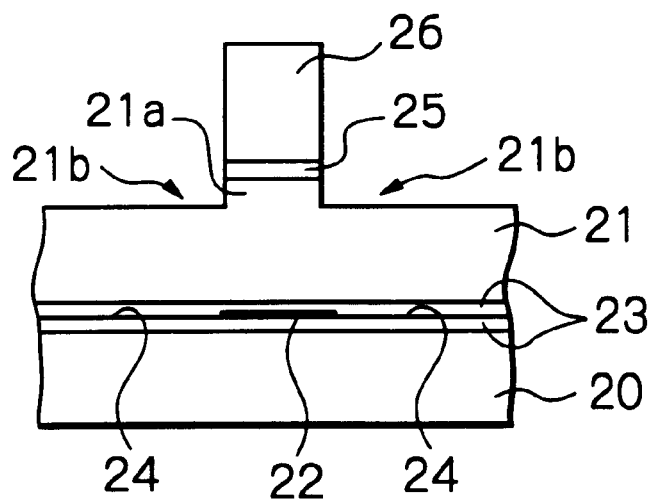
Figure 4:
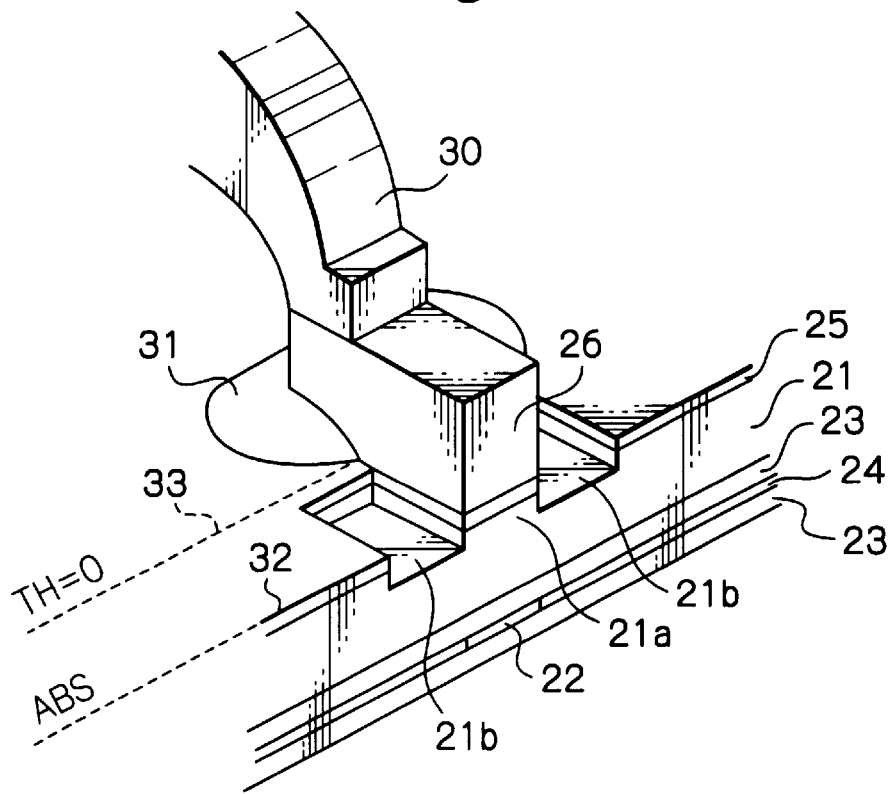
FIG. 4 is an oblique view illustrating pole layers and another layer near a zero-throat height of the thin-film magnetic head of the first embodiment shown in FIG. 2.
Figures 5A, 5B, 5C:
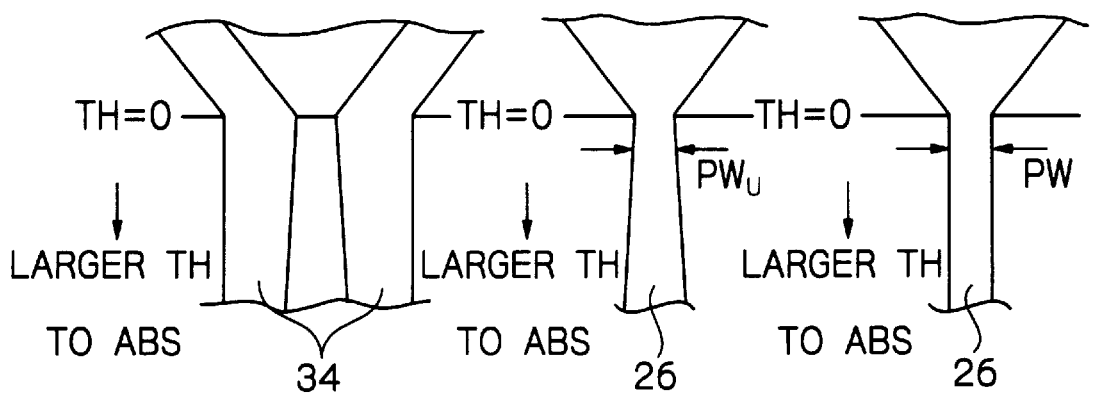
FIGS. 5a to 5c are plane views schematically illustrating a plane shape of a resist frame and an upper magnetic pole layer seen from the direction of multi-layering in the first embodiment shown in FIG. 2.

FIG. 2 schematically illustrates an essential part of a thin-film magnetic during a wafer process as a first embodiment according to the present invention, FIGS. 3a and 3b are sectional views of the thin-film magnetic head of the first embodiment, seen from a plane parallel to the ABS, FIG. 4 illustrates pole layers and another layer near a zero-throat height of the thin-film magnetic head of the first embodiment, and FIGS. 5a to 5c schematically illustrate a plane shape of a resist frame and an upper magnetic pole layer seen from the direction of multi-layering in the first embodiment. FIG. 3a indicates the state after a plating process of the upper pole layer but before a trimming process and FIG. 3b indicates the state after the trimming process.

In this first embodiment, a composite thin-film magnetic head with an inductive writing head element and a MR, GMR or TMR reading head element is fabricated.

In FIGS. 2 and 3, reference numeral 20 denotes a lower shield layer, 21 a lower magnetic pole or upper shield layer, 22 a MR element formed between the lower shield layer 20 and the lower pole layer 21 via an insulation layer 23, 24 lead conductors connected across the MR element 24, 25 a magnetic gap layer, 26 an upper magnetic pole layer opposed to the lower pole layer 21 through the magnetic gap layer 25, 27 a lower insulation layer, 28 an upper insulation layer, 29 a coil conductor formed between and embedded in the lower and upper insulation layers 27 and 28, and 30 a yoke layer, respectively. One end of the yoke layer 30 is coupled to the rear part of the upper pole layer 26, and the other end is coupled to the lower pole layer 21 in back. The thin-film magnetic head shown in FIG. 2 further has another insulation layer 31 formed at the ABS side base portion of the lower insulation layer 27 so as to define a position of the zero throat height (TH=0).

In the figure, furthermore, reference numeral 32 represents a plane of the ABS finally obtained by polishing in the throat-height adjustment process, and 33 a plane of the zero throat height (TH=0).

Manufacturing processes for obtaining the structure shown in FIG. 2 and FIG. 3a except for a process of forming the upper pole layer 26 are substantially the same as the conventional manufacturing processes.

Frame plating forms the upper pole layer 26. First, a resist frame 34 with a patterned shape shown in FIG. 5a is formed on the gap layer 25. Then, the upper pole layer 26 with the shape as shown in FIG. 5b is formed by the conventional plating process. A seed layer will be deposited on the gap layer 25 before plating.

In this first embodiment, the resist frame 34 has a patterned shape with a varying wall interval (distance between its inner walls) that linearly and continuously increases depending upon the throat height TH from a position of the zero throat-height (TH=0) or from a position near the zero throat-height (for example a position within a range of −1.0 $\mu m \leq TH \leq +1.0\ \mu m$). Thus, the formed upper pole layer 26 also has a shape with a varying width $PW_U$ (hereinafter also called as a pole width) that linearly and continuously increases depending upon the throat height TH from a position of the zero throat-height (TH=0) or from a position near the zero throat-height (for example a position within a range of $-1.0\,\mu\text{m}\leq\text{TH}\leq+1.0\,\mu\text{m}$). The shape of the photo mask used for making the resist frame will have the same shape as that of the resist frame in general.

An increasing rate of the wall interval or the pole width $\text{PW}_U$ with respect to the throat height TH, in other words, an inclination of the linear line of the side edge of the resist frame or the plated upper pole layer is determined by comparing an etching rate at the position of the zero throat-height (TH=0) or at the position near the zero throat-height (for example a position within a range of $-1.0\,\mu\text{m}\leq\text{TH}\leq+1.0\,\mu\text{m}$) with an etching rate at a predetermined position or etching rates at a plurality of predetermined positions with a larger throat height. These etching rates can be obtained by measuring pole widths at the respective positions after performing a trimming process for a sample having the same structure as this thin-film magnetic head except that the width of the upper pole layer is constant.

These etching rates will differ depending upon the three-dimensional shape of elements near the zero throat-height position (TH=0), such as the insulation layer and the yoke, or on the conditions of the dry etching. If both the three-dimensional shape and the conditions of the dry etching are the same, substantially the same etching rates can be expected.

A trimming process is executed after the upper pole layer 26 with the shape as shown in FIG. 5b is formed by the frame plating. In the trimming process, a part 21b of the upper surface of the lower pole layer 21 surrounding the upper pole layer 26 used as an etching mask is dry-etched to make a protruded portion or a pedestal 21a of the lower pole layer 21. This trimming process aims to make a width $\text{PW}_L$ of the protruded portion 21a of the lower pole layer 21 (hereinafter also called as a pole width), which opposes to the upper pole layer 26 via the gap layer 25, equal to a width $\text{PW}_U$ of the upper pole layer 26 (hereinafter also called as a pole width). The dry etching executed in this trimming process includes ion milling, reactive ion etching (RIE) and other etching.

During the dry etching, the upper pole layer 26 itself will be partly removed not only in its depth direction but also in its width direction and an etching rate will increase as the throat height TH becomes large due to the shadow effect, and thus the pole width $\text{PW}_U$ becomes gradually small depending upon the change of the etching rate. However, according to this embodiment, since the pole width $\text{PW}_U$ is compensated, as aforementioned, so as to increase linearly and continuously depending upon the throat height TH from a position of the zero throat-height (TH=0) or from a position near the zero throat-height (for example a position within a range of $-1.0\,\mu\text{m}\leq\text{TH}\leq+1.0\,\mu\text{m}$), the width PW of the upper and lower pole layers 26 and 21a after the trimming process is kept constant along the throat-height direction as shown in FIG. 5c.

Since the pole width is kept constant along with the throat-height direction, in the polishing process for adjusting the throat height (throat-height adjustment process) performed thereafter, a pole end edge width will not vary according to the machined or polished amount, and thus the yield of magnetic head manufacturing can be prevented from getting worse.

Figure 1A:
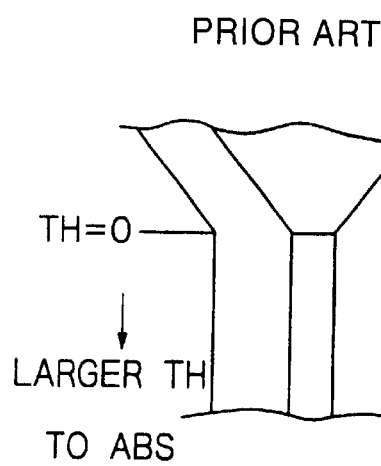
FIGS. 1a to 1c, already described, are plane views schematically illustrating a plane shape of a resist frame and an upper magnetic pole layer seen from the direction of multi-layering when fabricated by the conventional method.
Figure 1B:
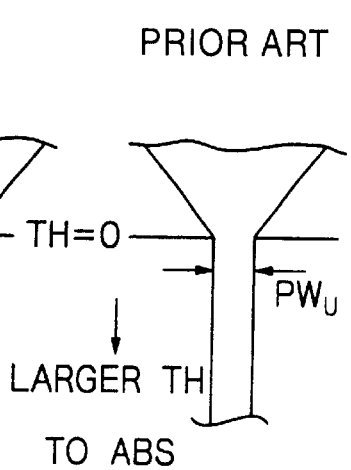
Figure 1C:
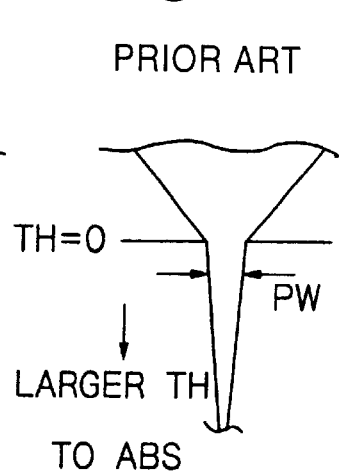
Figure 6:
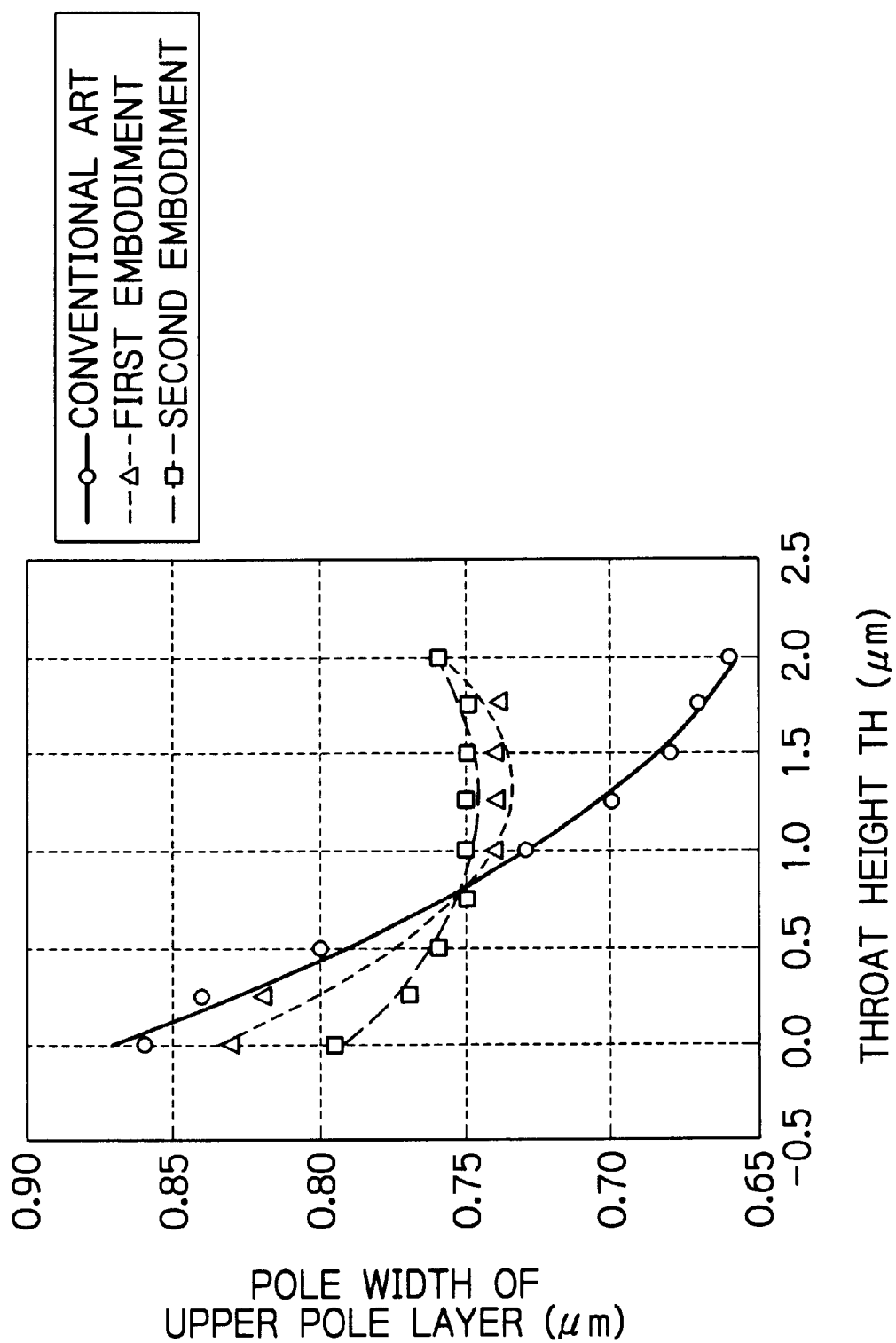
FIG. 6 is a graph illustrating throat-height dependability of a width of the upper pole layer after executing the trimming process in the first and second embodiments and in the conventional method.

FIG. 6 illustrates throat-height dependability of a pole width of the upper pole layer after executing the trimming process in the first embodiment shown in FIGS. 5a to 5c, in the second embodiment shown in FIGS. 7a to 7c and in the conventional method shown in FIGS 1a to 1c.

The wall interval of the resist frame or the width of the plated upper pole layer before trimming in the conventional method shown in FIGS. 1a to 1c is constant as 0.8 $\mu$m at TH=0 $\mu$m and 0.8 $\mu$m at TH=3.0 $\mu$m, whereas the wall interval of the resist frame 34 or the width of the plated upper pole layer 26 before trimming in the first embodiment shown in FIGS. 5a to 5c continuously and linearly increases in sequence as 0.8 $\mu$m at TH=0 $\mu$m, 0.9 $\mu$m at TH=1.0 $\mu$m, 1.0 $\mu$m at TH=2.0 $\mu$m and 1.1 $\mu$m at TH=3.0 $\mu$m. In the trimming process performed in the first embodiment, only a dry etching time is controlled so that the pole width of the upper pole layer becomes about 0.75 $\mu$m at a position of TH=0.75 $\mu$m.

As will be apparent from FIG. 6, according to the first embodiment, the pole width after the trimming is substantially constant within an actually used range of TH=0.5 to 1.5 $\mu$m and therefore throat-height dependability of the pole width is almost eliminated.

FIGS. 7a to 7c schematically illustrate a plane shape of a resist frame and an upper magnetic pole layer seen from the direction of multi-layering in a second embodiment according to the present invention.

As shown in FIGS. 7a and 7b, in this second embodiment, the relationship between the wall interval of the resist frame or the width of the plated upper pole layer before trimming and the throat height TH in the first embodiment is approximated using a quadratic curve. Namely, in this second embodiment, the resist frame has a patterned shape with a varying wall interval (distance between its inner walls) that continuously increases in a curve depending upon the throat height TH from a position of the zero throat-height (TH=0) or from a position near the zero throat-height (for example a position within a range of $-1.0\,\mu\text{m}\leq\text{TH}\leq+1.0\,\mu\text{m}$). Thus, the formed upper pole layer also has a shape with a varying width that continuously increases in a curve depending upon the throat height TH from a position of the zero throat-height (TH=0) or from a position near the zero throat-height (for example a position within a range of $-1.0\,\mu\text{m}\leq\text{TH}\leq+1.0\,\mu\text{m}$).

More concretely, in this second embodiment, the pole width continuously increases in a curve depending upon the throat height TH as 0.75 $\mu$m at TH=0 $\mu$m, 1.0 $\mu$m at TH=1.0 $\mu$m, 1.06 $\mu$m at TH=2.0 $\mu$m and 1.1 $\mu$m at TH=3.0 $\mu$m.

An increasing rate of the wall interval or the pole width $\text{PW}_U$ with respect to the throat height TH is determined by comparing an etching rate at the position of the zero throat-height (TH=0) or at the position near the zero throat-height (for example a position within a range of $-1.0\,\mu\text{m}\leq\text{TH}\leq+1.0\,\mu\text{m}$) with etching rates at a plurality of predetermined positions with larger throat heights. These etching rates can be obtained by measuring pole widths at the respective positions after performing a trimming process for a sample having the same structure as this thin-film magnetic head except that the width of the upper pole layer is constant.

A trimming process is executed after the upper pole layer with the shape as shown in FIG. 7b is formed by the frame plating. In the trimming process, the upper pole layer itself will be partly removed not only in its depth direction but also in its width direction and an etching rate will increase as the throat height TH becomes large due to the shadow effect, and thus the pole width becomes gradually small depending upon the change of the etching rate. However, according to this embodiment, since the pole width is compensated, as aforementioned, so as to increase continuously in a curve depending upon the throat height TH from a position of the zero throat-height (TH=0) or from a position near the zero throat-height (for example a position within a range of −1.0 μm≦TH≦+1.0 μm), the width PW of the upper and lower pole layers after the trimming process is kept constant along the throat-height direction as shown in FIG. 7c.

Since the pole width PW is kept constant along with the throat-height direction, in the polishing process for adjusting the throat height (throat-height adjustment process) performed thereafter, a pole end edge width will not vary according to the machined or polished amount. As will be apparent from FIG. 6, according to this second embodiment, the pole width after the trimming is substantially constant within an actually used range of TH=0.5 to 1.5 μm and therefore throat-height dependability of the pole width is almost eliminated. Thus, the yield of magnetic head manufacturing can be prevented from getting worse.

Another constitutions, operations and advantages in this second embodiment are almost the same as these in the first embodiment.

FIGS. 8a to 8c schematically illustrate a plane shape of a resist frame and an upper magnetic pole layer seen from the direction of multi-layering in a third embodiment according to the present invention.

As shown in FIGS. 8a and 8b, in this third embodiment, the resist frame has a patterned shape with a constant wall interval (distance between its inner walls) from a position of the zero throat-height (TH=0) or from a position near the zero throat-height (for example a position within a range of −1.0 μm≦TH≦+1.0 μm) to a predetermined position of a larger throat height, and with a varying wall interval that continuously and linearly increases depending upon the throat height TH from this predetermined position. Thus, the formed upper pole layer also has a shape with a constant width from the position of the zero throat-height (TH=0) or from the position near the zero throat-height (for example a position within a range of −1.0 μm≦TH≦+1.0 μm) to the predetermined position of a larger throat height, and with a varying width that continuously and linearly increases depending upon the throat height TH from the predetermined position.

An increasing rate of the wall interval or the pole width $PW_U$ with respect to the throat height TH is determined by comparing an etching rate at the position of the zero throat-height (TH=0) or at the position near the zero throat-height (for example a position within a range of −1.0 μm≦TH≦+1.0 μm) with etching rates at a plurality of predetermined positions with larger throat heights. These etching rates can be obtained by measuring pole widths at the respective positions after performing a trimming process for a sample having the same structure as this thin-film magnetic head except that the width of the upper pole layer is constant.

A trimming process is executed after the upper pole layer with the shape as shown in FIG. 8b is formed by the frame plating. In the trimming process, the upper pole layer itself will be partly removed not only in its depth direction but also in its width direction and an etching rate will increase as the throat height TH becomes large due to the shadow effect, and thus the pole width becomes gradually small depending upon the change of the etching rate. However, according to this embodiment, since the pole width is compensated, as aforementioned, so as to keep a constant pole width from the position of the zero throat-height (TH=0) or from the position near the zero throat-height (for example a position within a range of −1.0 μm≦TH≦+1.0 μm) to the predetermined position of a larger throat height and to continuously and linearly increase the pole width depending upon the throat height TH from the predetermined position, the width of the upper and lower pole layers after the trimming process is kept constant along the throat-height direction as shown in FIG. 8c.

Since the pole width PW is kept constant along with the throat-height direction, in the polishing process for adjusting the throat height (throat-height adjustment process) performed thereafter, a pole end edge width will not vary according to the machined or polished amount, and thus the yield of magnetic head manufacturing can be prevented from getting worse.

Another constitutions, operations and advantages in this third embodiment are almost the same as these in the first embodiment.

FIGS. 9a to 9c schematically illustrate a plane shape of a resist frame and an upper magnetic pole layer seen from the direction of multi-layering in a fourth embodiment according to the present invention.

As shown in FIGS. 9a and 9b, in this fourth embodiment, the resist frame has a patterned shape with a constant wall interval (distance between its inner walls) from a position of the zero throat-height (TH=0) or from a position near the zero throat-height (for example a position within a range of −1.0 μm≦TH≦+1.0 μm) to a predetermined position of a larger throat height, and with a varying wall interval that continuously increases in a curve depending upon the throat height TH from this predetermined position. Thus, the formed upper pole layer also has a shape with a constant width from the position of the zero throat-height (TH=0) or from the position near the zero throat-height (for example a position within a range of −1.0 μm≦TH≦+1.0 μm) to the predetermined position of a larger throat height, and with a varying width that continuously increases in a curve depending upon the throat height TH from the predetermined position.

An increasing rate of the wall interval or the pole width with respect to the throat height TH is determined by comparing an etching rate at the position of the zero throat-height (TH=0) or at the position near the zero throat-height (for example a position within a range of −1.0 μm≦TH≦+1.0 μm) with etching rates at a plurality of predetermined positions with larger throat heights. These etching rates can be obtained by measuring pole widths at the respective positions after performing a trimming process for a sample having the same structure as this thin-film magnetic head except that the width of the upper pole layer is constant.

A trimming process is executed after the upper pole layer with the shape as shown in FIG. 9b is formed by the frame plating. In the trimming process, the upper pole layer itself will be partly removed not only in its depth direction but also in its width direction and an etching rate will increase as the throat height TH becomes large due to the shadow effect, and thus the pole width becomes gradually small depending upon the change of the etching rate. However, according to this embodiment, since the pole width is compensated, as aforementioned, so as to keep a constant pole width from the position of the zero throat-height (TH=0) or from the position near the zero throat-height (for example a position within a range of −1.0 μm≦TH≦+1.0 μm) to the predetermined position of a larger throat height and to continuously increase the pole width in a curve depending upon the throat height TH from the predetermined position, the width of the upper and lower pole layers after the trimming process is kept constant along the throat-height direction as shown in FIG. 9c.

Since the pole width PW is kept constant along with the throat-height direction, in the polishing process for adjusting the throat height (throat-height adjustment process) performed thereafter, a pole end edge width will not vary according to the machined or polished amount, and thus the yield of magnetic head manufacturing can be prevented from getting worse.

Another constitutions, operations and advantages in this fourth embodiment are almost the same as these in the first embodiment.

According to the present invention, the upper pole layer can be formed, by the frame plating, in any shape without limited to that illustrated in the above-mentioned embodiments, if its pole width varies continuously or discontinuously along the throat-height direction depending upon the change in the etching rate during the trimming process.

The present invention can be applied to any type of thin-film magnetic head fabricated by a manufacturing process including the trimming process, such as a thin-film magnetic head with only an inductive writing head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a thin-film magnetic head having a throat height from a zero point to a maximum point, and a width that is perpendicular to said throat height, including the steps of:
    a first step of forming a second magnetic pole layer on a magnetic gap layer formed on a first magnetic pole layer so that said second magnetic pole layer opposes said first magnetic pole layer across said magnetic gap layer; and
    a second step of dry etching a part of an upper surface of said first magnetic pole layer surrounding said second magnetic pole layer used as an etching mask to make a width of said dry-etched part of said first magnetic pole layer equal to a width of said second magnetic pole layer,
    said first step comprising shaping at least part of said second magnetic pole layer so that the width of said second magnetic pole layer increases in a direction from the zero throat height to the maximum throat height.

2. The method as claimed in claim 1, wherein said first step comprises shaping said second magnetic pole layer so that the width of said second magnetic pole layer increases in a direction from the zero throat-height to the maximum throat height increases.

3. The method as claimed in claim 2, wherein the width of said second magnetic pole layer continuously increases in a direction from the zero throat height to the maximum throat height.

4. The method as claimed in claim 3, wherein the width of said second magnetic pole layer linearly increases in a direction from the zero throat height to the maximum throat height increases.

5. The method as claimed in claim 3, wherein the width of said second magnetic pole layer increases in a curve in a direction from the zero throat height to the maximum throat height increases.

6. The method as claimed in claim 2, wherein the width of said second magnetic pole layer increases at a non-continuous rate of increase in a direction from the zero throat height to the maximum throat height increases.

7. The method as claimed in claim 1, wherein said first step comprises shaping said second magnetic pole layer so that the width of said second magnetic pole layer increases within a region of the throat height TH=0 to +3 $\mu$m.

8. The method as claimed in claim 1, wherein said first step comprises shaping said second magnetic pole layer so that the width of said second magnetic pole layer is kept constant from a position of a zero throat-height to a predetermined position of a larger throat-height and increases from said predetermined position as the throat height increases.

9. The method as claimed in claim 8, wherein the width of said second magnetic pole layer continuously increases from said predetermined position as the throat height increases.

10. The method as claimed in claim 9, wherein the width of said second magnetic pole layer linearly increases from said predetermined position as the throat height increases.

11. The method as claimed in claim 9, wherein the width of said second magnetic pole layer increases in a curve from said predetermined position as the throat height increases.

12. The method as claimed in claim 8, wherein the width of said second magnetic pole layer increases at a non-continuous rate of increase from said predetermined position as the throat height increases.

13. The method as claimed in claim 1, wherein said first step comprises shaping said second magnetic pole layer so that the resulting width of said second magnetic pole layer increases in a direction from the zero throat height to the maximum throat height depending upon a change in etching rate of the dry etching.

14. The method as claimed in claim 1, wherein said first step comprises shaping said second magnetic pole layer so that the resulting width of said second magnetic pole layer increases in a direction from the zero throat height to the maximum throat height depending upon an etching rate near a position of zero throat-height during the dry etching and upon etching rates at predetermined positions with larger throat heights during the dry etching.

15. The method as claimed in claim 1, wherein said first step comprises shaping said second magnetic pole layer so that the resulting width of said second magnetic pole layer increases in a direction from the zero throat height to the maximum throat height depending upon etching rates determined by measuring, after the dry etching, widths of a sample that has a constant width in a direction from the zero throat height to the maximum throat height along the throat-height direction before the dry etching.

16. The method as claimed in claim 1, wherein said first step further comprises the step of patterning said second magnetic pole layer by a plating process.

* * * * *